US011561796B2

(12) United States Patent
Gorti et al.

(10) Patent No.: US 11,561,796 B2
(45) Date of Patent: Jan. 24, 2023

(54) LINKED MISS-TO-MISS INSTRUCTION PREFETCHER

(71) Applicant: International Business Machines Corporation, Armonk, NY (US)

(72) Inventors: Naga P. Gorti, Austin, TX (US); Mohit Karve, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 16/929,208

(22) Filed: Jul. 15, 2020

(65) Prior Publication Data

US 2022/0019440 A1 Jan. 20, 2022

(51) Int. Cl.
G06F 9/38 (2018.01)
G06F 12/08 (2016.01)
G06F 12/0862 (2016.01)
G06F 12/0875 (2016.01)

(52) U.S. Cl.
CPC .......... G06F 9/3802 (2013.01); G06F 9/3861 (2013.01); G06F 12/0862 (2013.01); G06F 12/0875 (2013.01)

(58) Field of Classification Search
None
See application file for complete search history.

(56) References Cited

U.S. PATENT DOCUMENTS

| | | | |
|---|---|---|---|
| 5,958,040 A * | 9/1999 | Jouppi | G06F 9/345 |
| | | | 712/E9.055 |
| 5,961,629 A * | 10/1999 | Nguyen | G06F 9/30054 |
| | | | 712/E9.055 |
| 7,085,915 B1 | 8/2006 | St. John et al. | |
| 8,738,860 B1 | 5/2014 | Griffin | |
| 8,856,452 B2 | 10/2014 | Sun et al. | |
| 9,280,474 B2 | 3/2016 | Pavlou et al. | |
| 9,811,341 B2 * | 11/2017 | Stavrou | G06F 9/3804 |
| 10,606,750 B1 | 3/2020 | Mattina | |
| 10,782,973 B2 * | 9/2020 | Bertolli | G06F 12/0875 |
| 2001/0001873 A1 * | 5/2001 | Wickeraad | G06F 12/121 |
| | | | 711/E12.07 |

(Continued)

FOREIGN PATENT DOCUMENTS

CN 102968294 A 3/2013

OTHER PUBLICATIONS

'Cache Miss Reduction Techniques for Embedded CPU Instruction Caches' by Kenneth W. Batcher, May 2008. (Year: 2008).*

(Continued)

*Primary Examiner* — Steven G Snyder
(74) *Attorney, Agent, or Firm* — Daniel M. Yeates

(57) ABSTRACT

A computer-implemented method to prefetch non-sequential instruction addresses (I/A) includes, determining, by a prefetch system, a first access attempt of a first I/A in a cache is a first miss, wherein the first I/A is included in a string of I/A's. The method further includes storing the first I/A in a linked miss-to-miss (LMTM) table. The method also includes determining a second access attempt of a second I/A in the cache is a second miss, wherein the second I/A is included in the string of I/A's. The method includes linking, in the LMTM table, the second miss to the first miss. The method also includes prefetching, in response to a third access attempt of the first I/A, the second I/A in the cache.

19 Claims, 4 Drawing Sheets

(56) References Cited

U.S. PATENT DOCUMENTS

| | | | | |
|---|---|---|---|---|
| 2007/0288697 | A1* | 12/2007 | Keltcher | G06F 12/0862 712/E9.047 |
| 2008/0034187 | A1* | 2/2008 | Stempel | G06F 9/3804 712/205 |
| 2011/0119426 | A1* | 5/2011 | Boyle | G06F 12/0862 711/135 |
| 2011/0219208 | A1* | 9/2011 | Asaad | G06F 9/06 712/12 |
| 2012/0311270 | A1* | 12/2012 | Sun | G06F 12/0862 711/E12.004 |
| 2012/0324142 | A1* | 12/2012 | Boyle | G06F 12/0862 711/3 |
| 2016/0335087 | A1* | 11/2016 | Bertolli | G06F 12/00 |
| 2020/0310817 | A1 | 10/2020 | Cook | |

OTHER PUBLICATIONS

Machine Translation of Chinese Patent Application CN 114721726 A, 2022. (Year: 2022).*

Disclosed Anonymously, "Mechanism to Decrease Cold Cache Startup Effects in Instruction Cache Prefetching", IP.com No. IPCOM000248538D, IP.com Electronic Publication Date: Dec. 14, 2016, An IP.com Prior Art Database Technical Disclosure, 7 pages.

Disclosed Anonymously, "Method and System for Providing a Single-Entry Instruction Effective-To-Real Address Translator (IERAT) for Power Efficiency and Timing", IP.com No. IPCOM000257687D, IP.com Electronic Publication Date: Mar. 2, 2019, An IP.com Prior Art Database Technical Disclosure, 3 pages.

Disclosed Anonymously, "Simultaneous Data Prefetch Request Probing and Recycled Data Forwarding from a Load Store Unit", IP.com No. IPCOM000221102D, IP.com Electronic Publication Date: Aug. 29, 2012, An IP.com Prior Art Database Technical Disclosure, 7 pages.

Spracklen et al., "Effective Instruction Prefetching in Chip Multi-processors for Modem Commercial Applications", Conference Paper, Mar. 2005, Research Gate, 13 pages.

Guo et al., "Energy-Efficient Hardware Data Prefetching", IEEE Transactions On Very Large Scale Integration (VLSI) Systems, vol. 19, No. 2, Feb. 2011, 14 pages.

Ebrahimi et al., "Techniques for Bandwidth-Efficient Prefetching of Linked Data Structures in Hybrid Prefetching Systems", Conference Paper, IEEE Xplore, Mar. 2009, 11 pages.

Anonymous. "Mechanism to Decrease Cold Cache Startup Effects in Instruction Cache Prefetching." Published Dec. 14, 2016. 7 pages. Published by IP.com. https://ip.com/IPCOM/000248538.

Anonymous. "Method and Apparatus for Early Fetch Redirection in a computer processor" Published Nov. 20, 2012. 6 pages. Published by IP.com. https://ip.com/IPCOM/000223643.

Crainiceanu, Adina, "Bloofi: A Hierarchical Bloom Filter Index with Applications to Distributed Data Provenance" Published Aug. 26, 2013. 8 pages. In Cloud-I '13.Published by ACM. Riva del Garda, Trento, Italy.

Ghosh, et al., "Way guard: A segmented counting bloom filter approach to reducing energy for set-associative caches." Conference Paper Published Jan. 2009 by Research Gate. 7 pages. In Proceedings of the International Symposium on Low Power Electronics and Design, Aug. 19-21, 2009. San Francisco, CA, USA. https://www.researchgate.net/publication/220846848.

IBM, Appendix P, List of IBM Patents or Patent Applications Treated as Related, 2 pages, dated Jul. 29, 2022.

Karve et al., "Miss-Driven Instruction Prefetching", U.S. Appl. No. 17/566,744, filed Dec. 31, 2021, 34 pages.

Mell, et al., "The NIST Definition of Cloud Computing," Recommendations of the National Institute of Standards and Technology, U.S. Department of Commerce, Special Publication 800-145, Sep. 2011, 7 pages.

Nikas, et al., "An Adaptive Bloom Filter Cache Partitioning Scheme for Multicore Architectures." Conference Paper Published Aug. 2008 by Research Gate. 9 pages. In Embedded Computer Systems: Architectures, Modeling, and Simulation, 2008. SAMOS 2008. https://www.researchgate.net/publication/224345769.

Peir, et al,; "Bloom Filtering Cache Misses for Accurate Data Speculation and Prefetching " ICS'02, Jun. 22-26, 2002, New York, New York, USA. 10 pages.

* cited by examiner

LINKED MISS-TO-MISS INSTRUCTION PREFETCHER

BACKGROUND

The present disclosure relates to instruction prefetchers, and, more specifically, non-sequential prefetchers.

In many modern computing systems one or more processors working together can run multiple applications (e.g., programs) simultaneously. To execute a program, the operating system, in simple terms, receives system calls from an application, then directs the processor to fetch the data to be processed, processes the data per the instructions (e.g., code), then writes the processed data to a storage location. In many instances latency to fetch instructions from a storage location is greater than the latency from processing the instructions.

SUMMARY

Disclosed is a computer-implemented method to prefetch non-sequential instruction addresses (I/A). The method includes, determining, by a prefetch system, a first access attempt of a first I/A in a cache is a first miss, wherein the first I/A is included in a string of I/A's. The method further includes storing the first I/A in a linked miss-to-miss (LMTM) table. The method also includes determining a second access attempt of a second I/A in the cache is a second miss, wherein the second I/A is included in the string of I/As. The method includes linking, in the LMTM table, the second miss to the first miss. The method also includes prefetching, in response to a third access attempt of the first I/A, the second I/A in the cache. Further aspects of the present disclosure are directed to computer program products containing functionality consistent with the method described above.

Further aspects of the present disclosure are directed to systems configured to prefetch non-sequential I/As. The system includes a processor, a long-term storage, a cache, a prefetch system and a computer-readable storage medium. The prefetch system includes a linked miss-to-miss (LMTM) table, wherein the LMTM table links a cache miss with a previous cache miss. The computer-readable storage medium is communicatively coupled to the processor and storing program instructions which, when executed by the processor, are configured to cause the processor to prefetch, in response to a first instruction address (I/A) being included in the LMTM table, a second I/A into the cache.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

In many instances latency to fetch data or instructions from a long-term storage location is greater than the latency from processing the data or instructions. Faster, but smaller, memory caches can be used to reduce the latency related to fetching data or instructions. As such, prefetch systems are configured to bring data and/or instructions into the cache prior to the processor requesting that data or those instructions.

In order to reduce computing latency and increase processor efficiency, embodiments of the present disclosure may use a cache miss-to-miss link to prefetch non-sequential instruction addresses.

Figure 1:
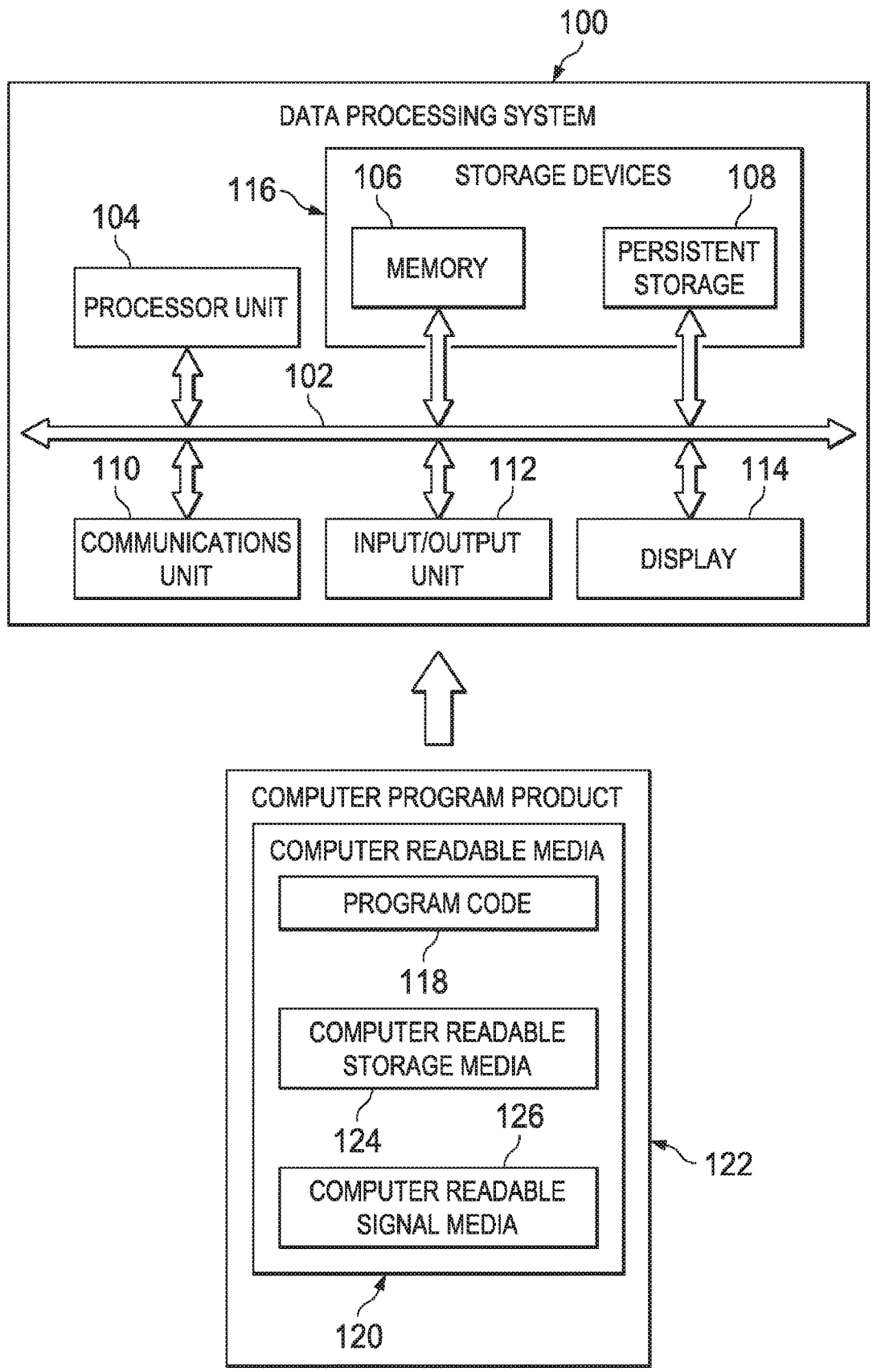
FIG. 1 is a block diagram of a DPS according to one or more embodiments disclosed herein.

The following acronyms may be used below:
API application program interface
ARM advanced RISC machine
CD—compact disc ROM
ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network Data Processing System in General FIG. 1 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Linked Miss-to-Miss Prefetch Table

In many modern computing systems, one or more processors working together can run multiple applications (e.g., programs) simultaneously. To execute a program, the operating system, in simple terms, receives system calls from an application, then directs the processor to fetch the data to be processed, processes the data per the instructions (e.g., code), then writes the processed data to a storage location. In many instances, latency to fetch instructions from a storage location is greater than the latency from processing the instructions.

Many versions of modern architecture use multiple levels of memory to reduce the latency related to fetching data, thereby increasing the efficiency of the overall system. Generally, the multi-level (or multi-tier) storage systems include a long-term storage and a short-term storage. Long term storage usually has a relatively large capacity but is relatively slow when compared to the short term. The short-term storage (e.g., random access memory (RAM), cache, etc.) are generally much faster with a relatively small capacity. Short term can be divided into several separate layers (e.g., multi-level cache). Each level can have a different size and/or speed. The size and speed of each level can be based on various tradeoffs of size, cost, and/or speed. For purposes of this disclosure, the short-term, faster memory will be referred to as a cache(s) (or memory cache).

In general, it takes more time to fetch instructions from long term storage to the processor than it takes to process the instructions. The time while a processor is waiting for instructions is called latency. Latency may also refer to a delay in the transmitting or processing of instructions. Embodiments of the present disclosure address the fact that reducing latency can increase the overall efficiency of a computing system. In some embodiments, instruction prefetching is used to reduce latency.

Instruction prefetching is a process by which the computing system attempts to predict which rows of instructions will be requested in the near future, then moving the future instruction into a high speed, low latency cache. The prediction can be based on current instructions, current data, historical usage, and other similar factors. If timed correctly, the instructions will be read into a cache just prior to the processor requesting it, akin to a just-in-time model. Ideally, the processor will retrieve the instructions from the cache on a first attempt, rather than waiting for the system to fetch the instructions from a slower, lower-tier storage.

There are two types of instruction prefetchers, sequential and non-sequential. Sequential instruction prefetchers build a history of the number of sequential lines of code that are consumed after a given instruction address (or initial instruction address). The next time this IA is observed, the sequential prefetcher will issue prefetches for the recorded number of sequential lines. However, sequential prefetchers cannot prefetch non-sequential data paths.

In some embodiments, non-sequential prefetchers, for a given IA, will remember the next initial IA that was consumed (on a previous pass). This allows the prefetcher to track complicated execution paths. Non-sequential prefetchers can use more power and require additional table space when compared to sequential prefetchers.

Embodiments of the present disclosure include a linked miss-to-miss table (or miss-to-miss table) (LMTM). The LMTM can prefetch lines further in the future based on a specific IA when compared to other non-sequential prefetchers. Additionally, the LMTM can produce fewer cache misses for a specific thread than previous non-sequential prefetchers, thus increasing the overall efficiency of the prefetch system, and the processing system as a whole. The LMTM is relatively small and thus requires less memory and less power to query.

Embodiments of the present disclosure use a prefetch system to record each cache miss. In some embodiments, the prefetch system links the cache miss with a previous miss. The links can be stored in a LMTM table. On a second pass the LMTM is queried. A hit on the LMTM precedes a prefetch of the previously missed I/A. Thus, even for non-sequential I/A's, the previously missed I/A is present in the cache for immediate consumption by the processor.

The aforementioned advantages are example advantages, and embodiments exist that can contain all, some, or none of the aforementioned advantages while remaining within the spirit and scope of the present disclosure.

Figure 2:
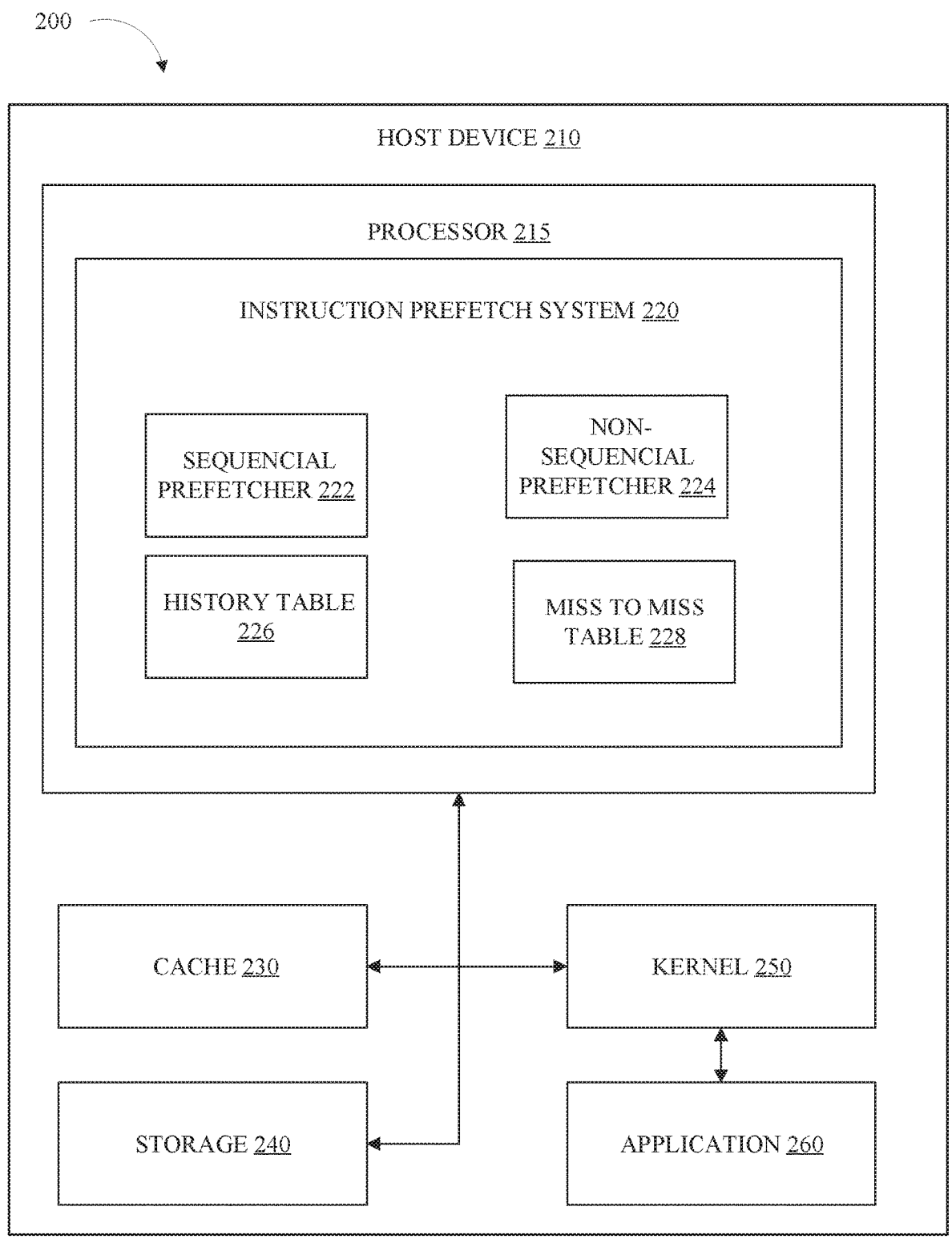
FIG. 2 illustrates a functional diagram of a computing environment suitable for operation of a prefetcher in accordance with some embodiments of the present disclosure.

Referring now to various embodiments of the disclosure in more detail, FIG. 2 is a representation of a computing environment 200, that is capable of running a prefetch manager in accordance with one or more embodiments of the present disclosure. Many modifications to the depicted environment may be made by those skilled in the art without departing from the scope of the disclosure.

Computing environment 200 includes host device 210. In some embodiments, host device 210 may include a computer system, such as the data processing system 100 of FIG. 1. Host device 210 can be a standalone computing device, a management server, a web server, a mobile computing device, or any other electronic device or computing system capable of receiving, sending, and processing data. In other embodiments, host device 210 can represent a server computing system utilizing multiple computers as a server system, such as in a cloud computing environment. In some embodiments, host device 210 represents a computing system utilizing clustered computers and components (e.g., database server computers, application server computers, etc.) that act as a single pool of seamless resources when accessed within computing environment 200. In some embodiments, host device 210 includes processor 215, cache 230, storage 240, kernel 250, and application 260.

Processor 215 can be any combination of hardware and/or software configured to execute program instructions provided by an application (e.g., application 260). In some embodiments, processor 215 is comprised of two or more processors (or cores) working in unison. In some embodiments, processor 215 can perform operations including, reading data from memory (e.g., storage 240), writing data to memory processing data, fetching data, prefetching data, etc. Processor 215 can be communicatively coupled to other components within host device 210 that includes, processor cache 230, storage 240, kernel 250, and application 260. In some embodiments, processor 215 includes instruction prefetch system 220.

Instruction prefetch system 220 can be any combination of hardware and/or software configured to prefetch instructions from one storage area (e.g., storage 240) to higher tier storage area (e.g., cache 230). In various embodiments, instruction prefetch system 220 predicts future instructions that will be executed based on current instructions, current data, historical usage, prefetch tables, and other similar factors. In some embodiments, instruction prefetch system 220 can be tuned such that the instructions are received at the cache (e.g., cache 230) shortly before they are requested by processor 215. In some embodiments, instruction prefetch system 220 includes sequential prefetcher 222, non-sequential prefetcher 224, history table 224, LMTM table 228.

In various embodiments, instruction prefetch system 220 can be configured to prefetch any number of lines at a time. For example, each fetch and/or prefetch may include 4 cache lines (rows, etc.) per I/A. However, for purposes of this disclosure, each prefetch and fetch will be described as a single line of data per I/A. In some embodiments, instruction prefetch system 220 can be configured to prefetch between any two levels of storage. However, for purposes of this disclosure, the prefetch discussion will limited to prefetching instructions from a long-term storage (e.g., storage 240) to a single cache (e.g., cache 230). This discussion does not limit this disclosure.

Sequential prefetcher 222 can be any combination of hardware and/or software configured to prefetch sequential rows of instructions. In some embodiments, sequential prefetcher 222 checks each IA against a table (e.g., history table 224). The table contains a set of IA's that are identified as an initial IA. Each initial IA is linked to a number (or set) of subsequent rows of instructions. The subsequent rows have previously been processed sequentially. For example, on a first pass, IA A-1 through A-10 are requested in that order; the sequence can be stored in the table. On the next pass, once IA A-1 is requested, the prefetcher can fetch A-2 through A-10 to the cache based on recognizing I/A A-1 based on the sequence stored in the first pass.

History table 224 can be any combination of hardware and/or software configured to store information relating to information flow through one or more processors 115. In some embodiments, history table 125 stores the information as one or more entries. In some embodiments, history table 125 includes an instruction address and a confidence score. In some embodiments, each entry includes an instruction address, one or more associated data address(es), and a confidence score. The confidence score can be high, low, or moderate.

Non-sequential prefetcher 226 may be a combination of hardware and/or software configured to prefetch non-sequential lines of code. In some embodiments, non-sequential prefetcher 226 tracks an order in which lines of code are requested. The data can be tracked in one or more tables. In some embodiments, the one or more tables include LMTM table 228.

LMTM table 228 that stores and links each cache miss in a processing sequence. In some embodiments, a cache miss occurs when an IA in not sequenced after the previous IA. For example, assume an IA access pattern is Z1, A1, A2, A3 and then B1, where A1-A3 are sequential. After Z1, the processor will check the cache for A1 and miss, and A1 will be recorded in LMTM table 228. The sequential prefetcher can then prefetch A2 and A3 based on A1, so each of those will result in a cache hit. B1 will cause a cache miss and be recorded in LMTM table 228 as the next miss after A1. In some embodiments, LMTM table 228 has each miss to miss in a row. From the above example, row one would include a first column with A1, and a second column with B1, and a second row with the first column with B1 and the second column with the next cache miss (e.g., C1). In some embodiments, LMTM table 228 builds a string of misses. For example, a first row has a first column with A1, a second column with B1, a third column with C1, and so on. Each row may include another identifier (e.g., a string identifier). The other identifier will indicate when the row is applicable.

Cache 230 can be any combination of hardware and/or software configured to store data to be processed. In some embodiments, cache 230 is smaller (e.g., stores less data) and faster than other storage (e.g., storage 240) in host device 210. In some embodiments, cache 230 includes two or more tier (or level) of cache systems (e.g., L1 cache, L2 cache, and L3 cache) that work in unison under the direction of kernel 250. Cache 230 may be communicatively coupled to other components within host device 210.

Because a cache is relatively small in size, the data in the contents of the cache are frequently turned over. In various embodiments, lines are kept in cache 230 according to one or more algorithms. For example, one algorithm can be least recently used (LRU). In an LRU cache, the lines that have not been used for the longest period of time are flushed from the cache when a new line needs to be written to the cache. In some embodiments, the algorithms that can manage a cache include, but are not limited to, pseudo least recently used (PLRU), first in first out (FIFO), last in first out (LIFO), etc.

In some embodiments, instruction prefetch system 220 includes two or more tiers (or levels) of prefetchers. For example, a higher-level cache (e.g., L1 cache—a faster cache) can fetch data from a lower level cache (e.g., an L2, and L3, etc.—slower caches) to the highest-level cache (e.g., an L1) and a lower level prefetcher can fetch data from any lower level memory (e.g., storage 240) to any higher-level memory other than the highest-level cache.

Storage 240 can be any combination of hardware and/or software configured to store data. In some embodiments, storage 240 stores the programs and instructions to operate and manage instruction prefetch system 220, host device 210, kernel 250, application 260, and/or any other programs or modules configured to operate in host device 210. Storage 240 may be communicatively coupled to other components within host device 210. In various embodiments, storage 240 includes one or more of cloud storage (public or private), tape drives, HDD, SAS drives, SSD, and any other storage medium known in the art. In some embodiments, storage 240 has a larger capacity than cache 230.

Kernel 250 can be any combination of hardware and software capable of managing the workload of host device 210 and provide access to low-level operating components of the host device 210. In some embodiments, kernel 250 receives system calls from one or more applications (e.g., application 260) requesting resources of host device 210. In these embodiments, kernel 250 prioritizes and executes the system calls based on one or more algorithms. In some embodiments, kernel 250 is part of the operating system of host device 210. Kernel 250 can be communicatively coupled to the other components of host device 210. In some embodiments, kernel 250 includes instruction prefetch system 220. In some embodiments, kernel 250 includes a queue of instructions that are in-line to be carried out by a processor 215. In some embodiments, the instructions are load and store instructions (e.g., read, write, etc.).

Kernel 250 can be any combination of hardware and software capable of managing the workload of host device 210 and provide access to low-level operating components of the host device 210. In some embodiments, kernel 250 receives system calls from one or more applications 260 requesting resources of host device 210. In these embodiments, kernel 250 prioritizes and executes the system calls based on one or more algorithms. In some embodiments, kernel 250 is part of the operating system of host device 210. Kernel 250 can be communicatively coupled to the other components of host device 210. In some embodiments, kernel 250 includes a queue of instructions that are in line to be carried out by a processor 215. In some embodiments, the instructions are load and store instructions (e.g., read, write, etc.).

Application 260 can be any combination of hardware and/or software configured to carry out a function on a computing device (e.g., host device 210). In some embodiments, application 260 is a web application. In some embodiments, application 260 sends system calls to kernel 250 and/or processor 215 and receives the processed results from kernel 250 and/or processor 215. The system call may include a data set. The data set can include the line(s) of code (instructions) to process, the location the code is stored at (instruction address), where/if to write the results, etc. In some embodiments, application 260 is a set of instructions configured to perform one or more tasks. In some embodiments, application 260 is a software program (e.g., accounting software, system backup software, word processor, etc.).

Figure 3:
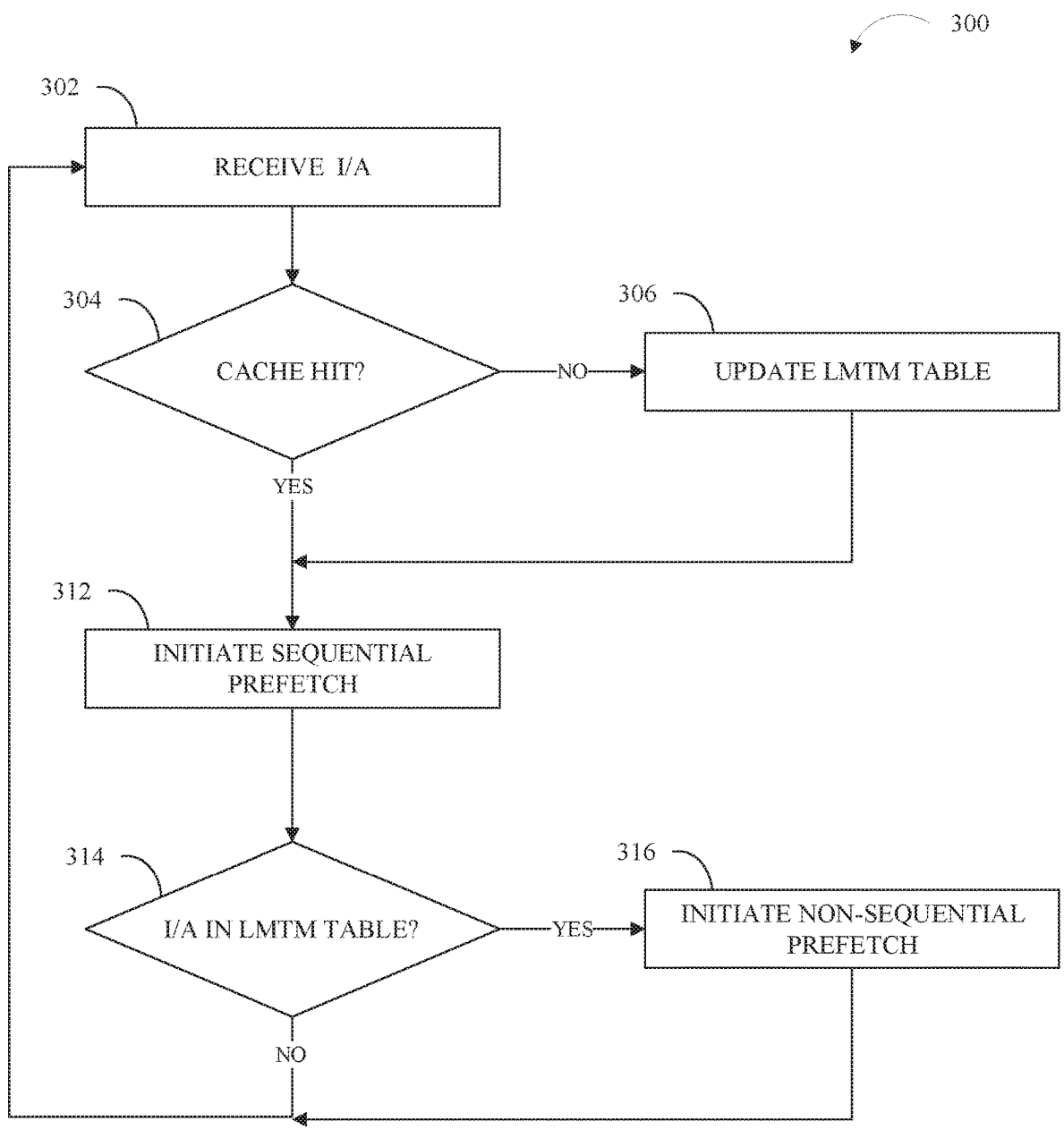
FIG. 3 illustrates a flow chart of an example method to prefetch non-sequential instructions addresses in accordance with some embodiments of the present disclosure.

FIG. 3 depicts a flowchart of an example method, method 300, for miss to miss non-sequential prefetching that can be performed in a computing environment (e.g., computing environment 200). One or more of the advantages and improvements described above for non-sequential prefetching may be realized by method 300, consistent with various embodiments of the present disclosure.

Method 300 can be implemented by one or more processors (e.g., processor 215), instruction prefetch system 220, kernel 250 and/or a different combination of hardware and/or software. In various embodiments, the various operations of method 500 are performed by one or more of processor 215, instruction prefetch system 220, kernel 250, and/or their subcomponents. For illustrative purposes, the method 300 will be described as being performed by instruction prefetch system 220.

At operation 302, instruction prefetch system 220 receives an I/A. In some embodiments, the I/A is received from one or more of processor 215, kernel 250, and/or application 260. The I/A can be associated with a processing thread. In some embodiments, the I/A is included in a sequence of instruction to execute. The sequence can be based on instruction received from kernel 250 and/or application 260.

At operation 304, instruction prefetch system 220 determines if the I/A is in the cache. In some embodiments, the I/A is in the cache in response to a cache hit (as opposed to a cache miss, when the I/A is not present in the cache). In some embodiments, the cache is a target cache. For example, if host device 210 includes a multi-level cache, and the I/A is in the L2 cache, the L1 cache can still be a miss if L1 is the target. In some embodiments, the cache hit is determined by processor 215. Processor 215 will notify instruction prefetch system 220 of the cache hit or the cache miss.

If it is determined the I/A is in the cache (304:YES), then instruction prefetch system 220 proceeds to operation 312. If it is determined the I/A is not in the cache (304:NO), then instruction prefetch system 220 proceeds to operation 306.

At operation 306, instruction prefetch system 220 updates an LMTM table (e.g., LMTM table 228). In some embodiments, updating the LMTM table includes recording the cache miss and linking it to previous and/or subsequent misses. Operation 306 builds an access pattern of non-sequential addresses based on starting point of one or more sequential I/A's. For example, if an access pattern is as follows, Z>A>A+1>B>C, then Z would be linked to A, which would be linked to B. The fact that A+1 is ignored provides some advantage of the LMTM table over other non-sequential prefetchers. It allows the size of the LMTM table to remain relatively small and have a limited power consumption. It can store only the Z to A to B, and ignore the number of intermediate I/A between Z and A and B.

At operation 312, instruction prefetch system 220 initiates a sequential prefetch. In some embodiments, the sequential prefetch include fetching a subsequent I/A. For example, if the current I/A is A, then the sequential prefetches would fetch A+1, if the I/A is A+1, then the A+2 would be fetched, and so on. In some embodiments, the sequential prefetch is based on a history table (e.g., history table 226). Instruction prefetch system 220 may query the history table to determine the A/I meets the requirements for the prefetch, and/or how many subsequent lines to prefetch. In some embodiments, instruction prefetch system 220 fetches the subsequent line for all I/A's.

At operation 314, instruction prefetch system 220 determines if the I/A is included in the LMTM table. In some embodiments, the I/A is in the LMTM table in response to an LMTM table hit. In some embodiments, the LMTM table query is similar to the cache query of operation 304.

If it is determined the I/A is in the LMTM table (314:YES), then instruction prefetch system 220 proceeds to operation 316. If it is determined the I/A is not in the LMTM table (314:NO), then instruction prefetch system 220 returns to operation 302 to receive a subsequent I/A.

At operation 316, instruction prefetch system 220 initiates non-sequential prefetcher. In some embodiments, operation 316 includes fetching the next non-sequential instruction address. The number of intermediate sequential I/A's that will be processed between the two is moot. Instruction prefetch system 220 returns to operation 302 in response to completing the non-sequential prefetch.

In some embodiments, the sequential prefetch and non-sequential prefetch are performed in parallel. A single I/A can be the trigger for multiple branches of the prefetch system.

The method 300 can result in fewer cache misses than other non-sequential prefetchers. Each and every non-sequential branch can be captured and subsequently (e.g., on a next pass), prefetched. This can increase the efficiency of the overall computing system by reducing latency to fetch data, and increasing the throughput of the processor.

Figure 4:
FIG. 4 illustrates a table of a non-sequential prefetch sequence.

FIG. 4 shows a table 400 to display one embodiment of using an LMTM table for non-sequential prefetching. Column 410 displays the I/A access order. Z to A to A+1, etc. Column 420 displays the instruction prefetch system 220 data on a first pass of a string of I/A's. For each I/A column 420 records whether there was a cache hit, the I/A of the last miss, when the LMTM table is updated and what I/A's are prefetched based on the current access. Column 430 displays instruction prefetch system 220 data on an Nth pass of the same access pattern, where N is an integer index. Column 430 includes whether the access hit in the cache and what I/A's are prefetched. In some embodiments, instruction prefetch system 220 can prefetch two paths based on a single I/A. One path can be sequential and the other non-sequential. For example, at access C, on the Nth pass, instruction prefetch system 220 will prefetch both C+1 and D. It can hold D in the cache until D is accessed. In some embodiments, the cache turnover algorithm is updated to retain the non-sequential prefetch until it is accessed. This can be accomplished by a flag and/or some other indicator of importance.

Table 400 shows the performance benefit of the LMTM table by having no cache misses on the second pass. The non-sequential chain can be easily expanded. For example, assume on a second pass, access Z is replaced with access Y. The first pass with access Y to A, the LMTM table is updated the Y to A link and the remaining access path can be prefetched as previously described. Then on the next pass from Y to A, the LMTM table will cause A to be prefetched in response to Y.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for prefetching instruction addresses (I/A) comprising:
   determining, by a prefetch system, a first access attempt on a first pass of a first I/A in a cache is a first miss, wherein the first I/A is included in a string of I/A's;
   storing the first I/A in a linked miss-to-miss (LMTM) table;
   determining a second access attempt on the first pass of a second I/A in the cache is a second miss, wherein the second I/A is included in the string of I/A's;
   linking, in the LMTM table, the second miss to the first miss, wherein the linking is based on the first access attempt and the second access attempt being in the first pass; and
   prefetching, on a second pass and in response to a third access attempt of the first I/A in the cache being a miss, the second I/A into the cache and a third I/A included in the string of I/A's into the cache, wherein the third I/A immediately follows the first I/A in the string of I/A's.

2. The method of claim 1, wherein the second I/A and the first I/A are non-sequential in a long-term storage.

3. The method of claim 1, wherein the third I/A is immediately subsequent to the first I/A in a long-term storage and in the string of I/A's.

4. The method of claim 3, wherein the prefetch system includes a sequential prefetcher and a non-sequential prefetcher.

5. The method of claim 4, wherein the prefetching of the second I/A is performed by the non-sequential prefetcher, and the fetching of the third I/A is performed by the sequential prefetcher.

6. The method of claim 4, wherein the prefetching of the second I/A and fetching the third I/A are performed in parallel.

7. The method of claim 1, further comprising:
determining a fourth access request for the second I/A results in a cache hit.

8. The method of claim 7, wherein the cache is configured to maintain the second I/A in the cache until the cache hit.

9. The method of claim 1 wherein the cache is a highest tier cache.

10. A system for prefetching comprising:
a processor;
a long-term storage;
a cache;
a prefetch system that includes a linked miss-to-miss (LMTM) table, wherein, on a first pass the LMTM table links a cache miss for a first instruction address (I/A) with a previous second cache miss for a second I/A; and
a computer-readable storage medium communicatively coupled to the processor and storing program instructions which, when executed by the processor, are configured to cause the processor to:
prefetch, in response to the first instruction address being included in the LMTM table and a third cache miss for the first I/A on a second pass, the second I/A into the cache and a third I/A into the cache, wherein the third I/A immediately follows the first I/A in a string of I/A's.

11. The system of claim 10, wherein the program instructions are further configured to cause the processor to:
add, on the first pass, the first I/A and the second I/A to the LMTM table.

12. The system of claim 11, wherein the first I/A and the second I/A are included in the string of I/As, the first I/A precedes the second in the string of I/As.

13. The system of claim 12, wherein the first I/A and the second I/A are stored non-sequentially in the long-term storage.

14. The system of claim 10 wherein the prefetch system further comprises a sequential prefetcher, and the program instructions are further configured to cause the processor to:
prefetch, in parallel with prefetching the second I/A, a set of I/As, wherein the set of I/A are stored in the long term storage sequentially with the first I/A, and the third I/A is included in the set of I/A's.

15. A computer program product, the computer program product comprising a computer readable storage medium having program instructions embodied therewith, the program instructions executable by a processing unit to cause the processing unit to:
determine, by a prefetch system, a first access attempt on a first pass of a first I/A in a cache is a first miss, wherein the first I/A is included in a string of I/A's;
store the first I/A in a linked miss-to-miss (LMTM) table;
determine a second access attempt on the first pass of a second I/A in the cache is a second miss, wherein the second I/A is included in the string of I/A's;
link, in the LMTM table, the second miss to the first miss, wherein the linking is based on the first access attempt and the second access attempt being in the first pass; and
prefetch, on a second pass and in response to a third access attempt of the first I/A in the cache being a miss, the second I/A into the cache and a third I/A included in the string of I/A's into the cache, wherein the third I/A immediately follows the first I/A in the string of I/A's.

16. The computer program product of claim 15, wherein the second I/A and the first I/A are non-sequential in a long-term storage.

17. The computer program product of claim 15, wherein the program instructions are further configured to cause the processing unit to:
fetch, in response to the first access attempt, a third I/A included in the string of I/A's, wherein the third I/A immediately follows the first I/A in the string of I/A's.

18. The computer program product of claim 17, wherein the third I/A is sequential to the first I/A in a long-term storage.

19. The computer program product of claim 18, wherein the prefetch system includes a sequential prefetcher and a non-sequential prefetcher.

* * * * *